Feb. 9, 1932.  A. ERICKSON  1,844,216
AUTOMOBILE BUMPER
Filed March 21, 1931
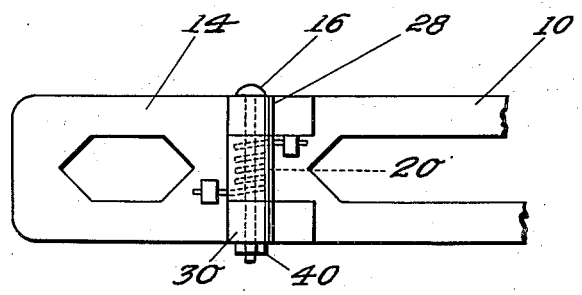
Fig.1
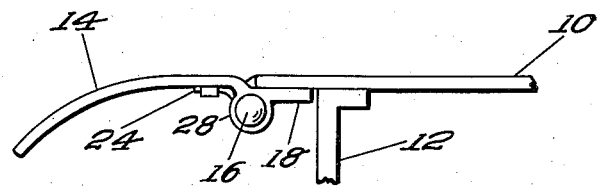
Fig.2
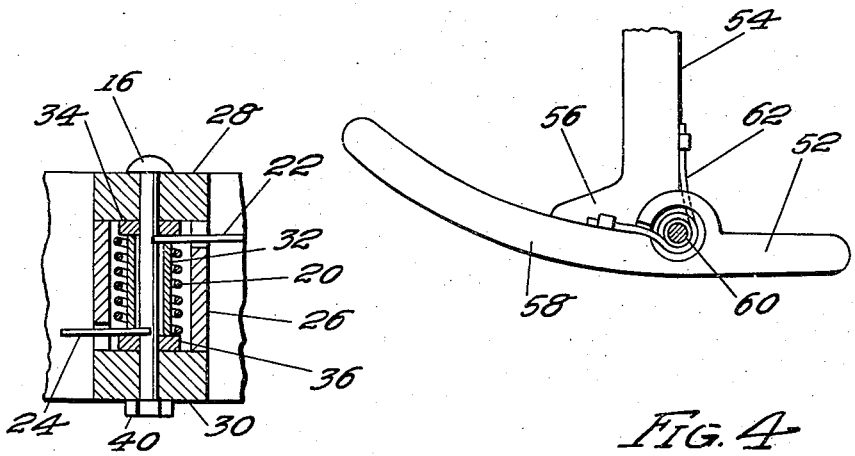
Fig.3
Fig.4
ANDREW ERICKSON
INVENTOR
PER *Gust Hjelm*
ATTORNEY Patented Feb. 9, 1932

1,844,216

UNITED STATES PATENT OFFICE

ANDREW ERICKSON, OF HAMILTON, ONTARIO, CANADA

AUTOMOBILE BUMPER

Application filed March 21, 1931. Serial No. 524,336.

This invention relates to an improved automobile bumper, and has for one of its principle objects the provision of a bumper for automobiles or the like which, in addition to protecting the car from injury by collisions, either in front or rear, will also allow of a ready detaching of the same from any objects upon which it is liable to get caught.

One of the important features of this invention resides in the provision of an automobile bumper which while readily resisting pressure from one direction will automatically give way to a pull or pressure from another direction, so that the annoyance and danger consequent upon the bumper catching onto the corresponding portion of the bumper on another car will be avoided.

Another and still further important object of the invention resides in the particular combination of parts of which the novel bumper of this invention is composed, whereby a satisfactory and suitable construction results, and one which is free from rattles, and which, furthermore, will positively operate under all conditions of service.

Other and further important objects of the invention will be apparent from the disclosures in the accompanying drawings and following specification.

The invention, in a preferred form, is illustrated in the drawings and hereinafter more fully described.

In the drawings:

Figure 1 is a rear elevation of one end of the improved bumper of this invention, parts being broken away to show the interior construction.

Figure 2 is a top view of the bumper shown in Figure 1.

Figure 3 is a detail view, partly in section, illustrating the attaching and operating means for the movable portion of the bumper.

Figure 4 illustrates a modification, and particularly one adaptable for a rear bumper construction.

As shown in the drawings:

The reference numeral 10 indicates generally the main portion or cross-bar of an automobile bumper which can be of any desired shape, size, or material, and which can be fastened to an extending bracket 12 or other portion of a car in any suitable manner.

A side extension 14 is provided for the bumper element 10, this side extension being separate from the main portion, and pivotally mounted on the end thereof by means of a pivot pin or the like 16, it being obvious that this same construction is mounted on the other end of the bumper. A side element 18 is provided whereby rearward pivotal action of the attachment 14 beyond the position shown in Figure 2 is positively prevented.

However, it often happens that when working in close quarters the outer end of an automobile bumper is forced around some projection such as another automobile bumper, a tree, portion of a fence, or garage, or some other object. With the usual bumper, it is normally impossible to extricate the same except by either jacking up the car and sliding it sidewise, or by removing the bumper. It will be obvious from the pivoted construction of the improved bumper of this invention that the portion 14 is free to move outwardly thereby allowing the same to readily slide rearwardly and pass any such obstruction over which it may have inadvertently passed.

In order to return the hinged portion 14 to proper position after such obstruction has been passed, a helical spring 20 is provided, the same being provided with upper and lower ends 22 and 24 respectively fitted into suitable slots in a housing 26 which forms part of the bumper element 10, the housing being in cylindrical form and also adapted to cooperate with corresponding cylindrical elements 28 and 30 mounted on or forming part of the hinged bumper element 14, whereby a suitably hinged structure results.

In order that the spring 20 be positively and securely retained in operative position, a movable sleeve 32 is provided, this being of a smaller diameter than the diameter of the spring, and adapted to fit between the same and the pin 16. Additional positioning and wear resisting elements are provided in the form of washers or the like 34 and 36 which are mounted at the top and bottom respectively of the spring 20 and which contact with the upper and lower edges of the sleeve 32. The upper and lower faces of these washers 34 and 36 respectively fit against the corresponding faces of the hinged members 28 and 30 whereby a substantial and secure construction results which is positively free from rattling or undesirable displacement under any and all conditions. A removable nut 40 is preferably provided for the lower end of the pin or bolt 16 whereby the device can be readily assembly, and also may be disassembled for the purpose of repair or for replacement of any parts, if such replacement ever becomes necessary.

In Figure 4 is illustrated a slight modification of the invention showing the same as applied to a pivoted type of bumper such as is sometimes used on the rear of an automobile or the like. In this instance, a relatively fixed bumper element 52 is mounted on a bracket 54 or other portion of a car, this bracket provided with an integral lug 56 against which a hinged portion 58 of the bumper is adapted to contact, whereby undesirable motion in this direction is positively avoided. The portion 58 is, however, hinged at the point 60, whereby movement away from the lug 56 is permitted against the tension of a coil spring 62 which will act to return the member 58 to normal position after any contingency necessitating its displacement has passed. The construction of the spring 62 and its associated elements is similar to that illustrated in Figure 3.

It will be evident that herein is provided a bumper construction which will eliminate considerable damage to automobiles and the parts thereof, particularly the bumpers, and will also eliminate the delay and annoyance due to undesirable locking with the bumpers of other automobiles or behind other structures. At the same time there is provided a device which satisfactorily meets all the requirements of the modern automobile bumper, and one which will not become loose and rattle on account of displacement of parts or wear. Additionally, the device is readily assembled, is composed of a minimum of parts, any or all of which can be conveniently or economically replaced whenever desired, and which furthermore is not likely to get out of order.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. An automobile bumper, including a main relatively fixed element, and an auxiliary element hingedly mounted on the main element for movement in one direction only, the main element including a hinged lug, and a pair of cooperating hinged lugs on the auxiliary element, a hinge pin passing through the aligned lugs, and a spring in the main lug for returning the hinged element to normal position after displacement, and a cylindrical sleeve mounted inside the spring and surrounding the hinge pin.

2. An automobile bumper, including a main relatively fixed element, and an auxiliary element hingedly mounted on the main element for movement in one direction only, the main element including a hinged lug, and a pair of cooperating hinged lugs on the auxiliary element, a hinge pin passing through the aligned lugs, and a spring in the main lug for returning the hinged element to normal position after displacement, and a cylindrical sleeve mounted inside the spring and surrounding the hinge pin, together with flat washers above and below the spring surrounding the pin and contacting with the upper and lower hinge lugs.

In testimony whereof I affix my signature.

ANDREW ERICKSON.